(12) United States Patent
Kumar et al.

(10) Patent No.: US 11,688,398 B2
(45) Date of Patent: Jun. 27, 2023

(54) VIRTUAL ASSISTANT FOR A COMMUNICATION SESSION

(71) Applicant: ZEBRA TECHNOLOGIES CORPORATION, Lincolnshire, IL (US)

(72) Inventors: Pawan Kumar, Bangalore (IN); Mohan P. Kumar, Bangalore (IN); Anusha N R, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/333,830

(22) Filed: May 28, 2021

(65) Prior Publication Data
US 2022/0383871 A1 Dec. 1, 2022

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
USPC ..................................................... 704/1–504
See application file for complete search history.

(56) References Cited

U.S. PATENT DOCUMENTS

| | | | |
|---|---|---|---|
| 10,388,272 B1* | 8/2019 | Thomson | G10L 15/22 |
| 10,573,312 B1* | 2/2020 | Thomson | G10L 15/187 |
| 10,672,383 B1* | 6/2020 | Thomson | G06N 20/00 |
| 10,791,078 B2* | 9/2020 | Bergenlid | H04L 51/10 |
| 10,971,153 B2* | 4/2021 | Thomson | G10L 15/187 |
| 11,017,778 B1* | 5/2021 | Thomson | H04M 3/42382 |
| 11,128,636 B1* | 9/2021 | Jorasch | A61B 5/369 |
| 11,145,312 B2* | 10/2021 | Thomson | G10L 15/26 |
| 11,170,761 B2* | 11/2021 | Thomson | G10L 15/06 |
| 11,218,565 B2* | 1/2022 | Brush | G06F 3/167 |
| 11,238,656 B1* | 2/2022 | Lin | H04N 23/60 |
| 2019/0036856 A1* | 1/2019 | Bergenlid | H04N 21/4788 |
| 2020/0034108 A1* | 1/2020 | Mozer | G06F 3/167 |
| 2020/0105273 A1* | 4/2020 | O'Donovan | G10L 15/30 |
| 2020/0175961 A1* | 6/2020 | Thomson | G10L 15/28 |
| 2020/0175962 A1* | 6/2020 | Thomson | G10L 15/197 |
| 2020/0175987 A1* | 6/2020 | Thomson | G10L 15/26 |
| 2020/0243094 A1* | 7/2020 | Thomson | H04M 3/42382 |
| 2021/0074068 A1* | 3/2021 | Spivack | G06F 3/011 |
| 2021/0126985 A1* | 4/2021 | Brush | H04L 67/60 |
| 2021/0209388 A1* | 7/2021 | Ciftci | G06N 3/08 |
| 2021/0233530 A1* | 7/2021 | Thomson | G10L 15/30 |

* cited by examiner

*Primary Examiner* — Marcus T Riley

(57) ABSTRACT

A virtual assistant for a communication session is disclosed herein. A device may receive, during a communication session, an invocation input that is associated with invoking a virtual assistant. The invocation input may be received from a user, of the device, involved in the communication session. The virtual assistant may be associated with a communication application that is hosting the communication session. The device may receive, from the user, a voice command associated with the virtual assistant. The voice command may include instructions associated with adjusting a setting of a feature of the communication session. The device may enable the virtual assistant to identify the setting of the feature from the voice command. The device may configure, in association with the virtual assistant, the feature of the communication session according to the setting.

18 Claims, 9 Drawing Sheets

VIRTUAL ASSISTANT FOR A COMMUNICATION SESSION

BACKGROUND

A virtual assistant may be installed on user device to assist a user of the user device to perform one or more operations. However, the user device is typically configured to include and/or execute various applications that utilize a user interface component (e.g., an input component and/or an output component) of the user device that is used by the virtual assistant to assist the user. Accordingly, to permit the user to use a virtual assistant during an application session that is executing on the user device, there is a need for the virtual assistant to be able to utilize the user interface component during the application session.

SUMMARY

In some implementations, a method includes receiving, during a communication session, an invocation input that is associated with invoking a virtual assistant, wherein the invocation input is received from a user involved in the communication session; activating the virtual assistant to access a communication application that is hosting the communication session; receiving, from the user, a voice command associated with the virtual assistant; determining, via the virtual assistant, that a setting of a feature associated with another user of the communication session is to be adjusted according to the voice command, wherein the setting and the feature are identified in the voice command in association with the other user; and performing, in association with the virtual assistant, an action associated with configuring an output of the communication application that is associated with the other user according to the setting of the feature.

In some implementations, a device includes one or more memories, and one or more processors, coupled to the one or more memories, configured to: receive, during a communication session, an invocation input that is associated with invoking a virtual assistant, wherein the invocation input is received from a user, of the device, involved in the communication session; activate the virtual assistant to access a communication application that is hosting the communication session; receive, from the user, a voice command associated with the virtual assistant; determine, via the virtual assistant, a setting of a feature of the communication application in association with the communication session, wherein the setting and the feature are identified in the voice command; and perform, in association with the virtual assistant, an action associated with configuring the setting of the feature.

In some implementations, a tangible machine-readable medium storing a set of instructions includes one or more instructions that, when executed by one or more processors of a device, cause the device to: receive, during a communication session, an invocation input that is associated with invoking a virtual assistant, wherein the invocation input is received from a user, of the device, involved in the communication session, and wherein the virtual assistant is associated with a communication application that is hosting the communication session; receive, from the user, a voice command associated with the virtual assistant, wherein the voice command includes instructions associated with adjusting a setting of a feature of the communication session; enable the virtual assistant to identify the setting of the feature from the voice command; and configure, in association with the virtual assistant, the feature of the communication session according to the setting.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

Figure 1A:
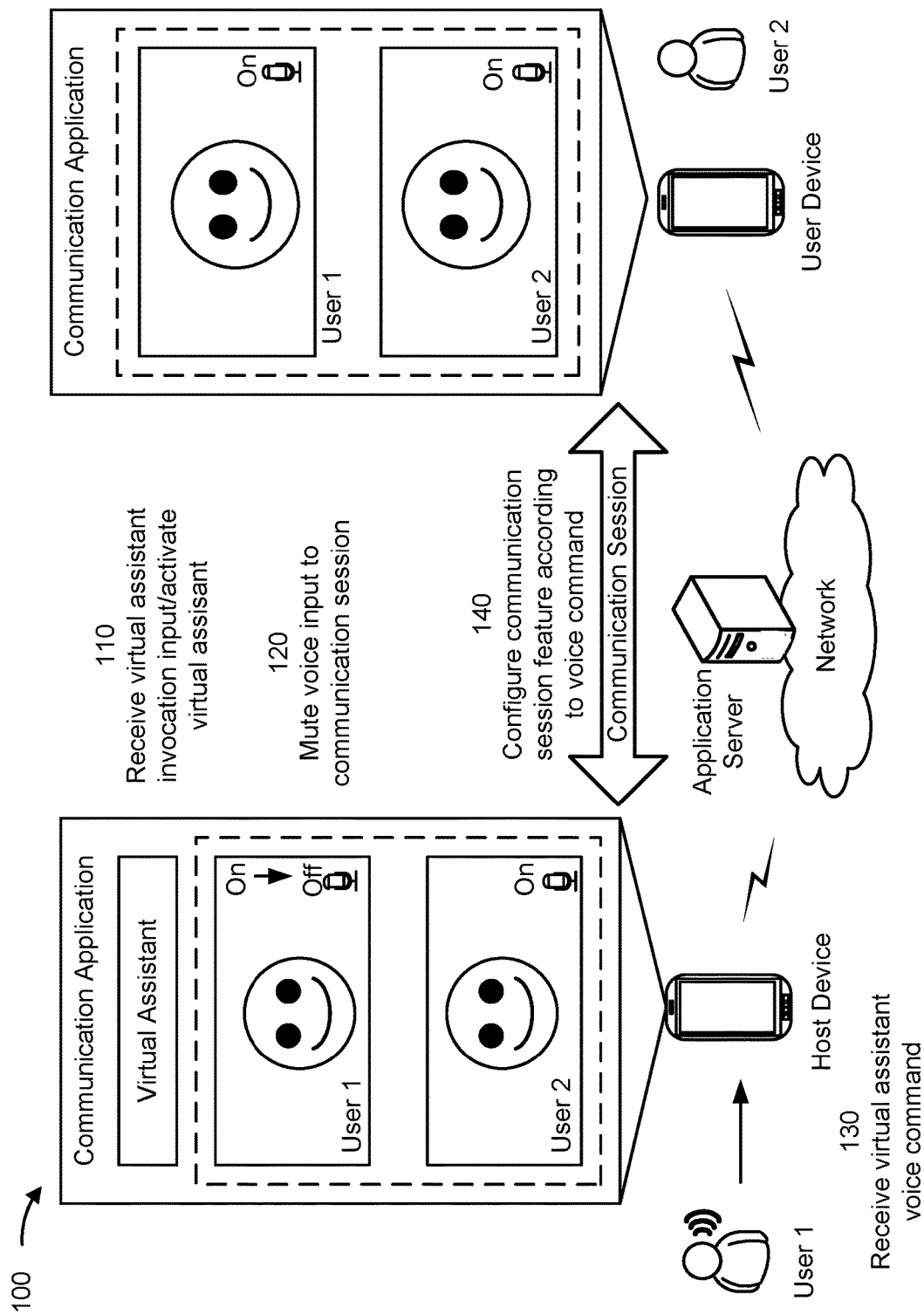
FIGS. 1A-1C are diagrams of an example implementation described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

A user device may include a virtual assistant device that may assist a user of the user device to use the user device to perform an operation (e.g., perform a search, set a calendar event, adjust a volume level, and/or initiate a communication session). The user may activate the virtual assistant via an input component (e.g., a microphone, a button, and/or a touchscreen) of the user device and/or obtain information from the virtual assistant via an output component (e.g., a speaker and/or a display device) of the user device. For example, the user may activate and/or instruct the virtual assistant to perform an action via a voice command that is detected and/or received via a microphone of the user device. Additionally, or alternatively, the virtual assistant may acknowledge receipt of the command via a speaker and/or output information associated with an operation requested in the command via the display device. However, during certain types of ongoing application sessions, the virtual assistant may be disabled and/or incapable of assisting the user. For example, during a communication session (e.g., a voice call, a conference call, and/or a virtual meeting hosted via a communication application), a microphone and/or speaker of a user device may be dedicated for use in association with the communication session (or at least prioritized over other applications or modules of the user device, such as the virtual assistant). In such a case, the virtual assistant may be prevented from assisting the user with performing an operation of the user device, including an operation that involves making an adjustment to the communication session. Accordingly, there is a need for a virtual assistant to have access to an input component and/or an output component that is being used to facilitate an application session, to permit the virtual assistant to receive a command via the input component and/or output information via the output component.

Some implementations described herein provide a virtual assistant that is configured for use during an application session. For example, the virtual assistant may be installed within a user device and/or embedded within an application of the user device. The user device, during an application session (e.g., a communication session), may receive an invocation input to activate the virtual assistant, enable the virtual assistant to access an input component (e.g., a microphone) of the user device to receive a command (e.g., a voice command), and receive the command via the input component. Correspondingly, the user device and/or the virtual assistant may process the command and perform an action associated with the user device and/or the communication session. As a more specific example, during a virtual meeting, the virtual assistant may be invoked by a user (e.g., via an invocation input). The user device may enable the virtual assistant to receive a voice command via the microphone (e.g., after an input to the virtual meeting that is associated with the user is muted) requesting an adjustment to the communication session. Such a voice command may include a command to adjust an output volume level of a speaker of the user device, a command to adjust a volume level of another user (and/or mute another user) involved in the virtual meeting, and/or a command to turn off a video feed associated with the user or another user involved in the virtual meeting, among other examples. Accordingly, the user device and/or virtual assistant may process the voice command and perform one or more corresponding operations involving the user device and/or the communication session that are identified in the voice command.

In this way, a user device may include a virtual assistant, as described herein, that facilitates control of the user device during an application session, thereby enhancing a user experience by permitting handsfree control of the user device and/or handsfree control of the application session. Furthermore, the user device, as described herein, may facilitate use of a virtual assistant of the user device while the user device is engaged in a communication session. For example, the user device and/or virtual assistant may provide automated control over one or more features of a communication application (e.g., a mute feature and/or a notification feature) associated with the communication session. In this way, rather than a user having to provide multiple inputs to mute a microphone of the user device and/or send a notification associated with the virtual assistant, the user may provide a single user input (e.g., an invocation input that invokes the virtual assistant) that invokes the virtual assistant and correspondingly controls the one or more features of the communication application. Accordingly, the user device and/or the virtual assistant may conserve computing resources (e.g., processing resources and/or memory resources) that might otherwise be used to invoke a virtual assistant and control one or more features of a communication session (or other application session) of the user device.

Figure 1B:
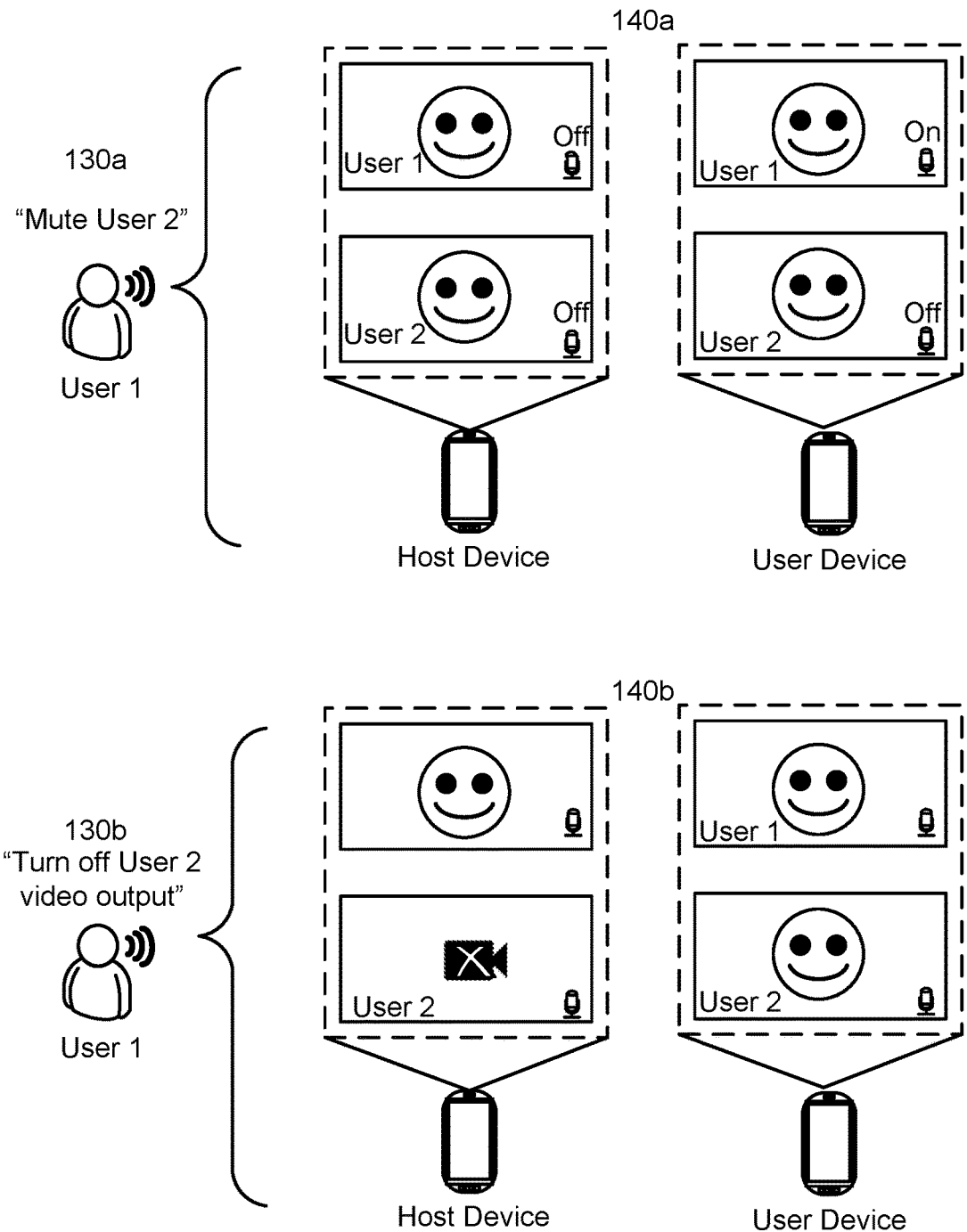
Figure 1C:
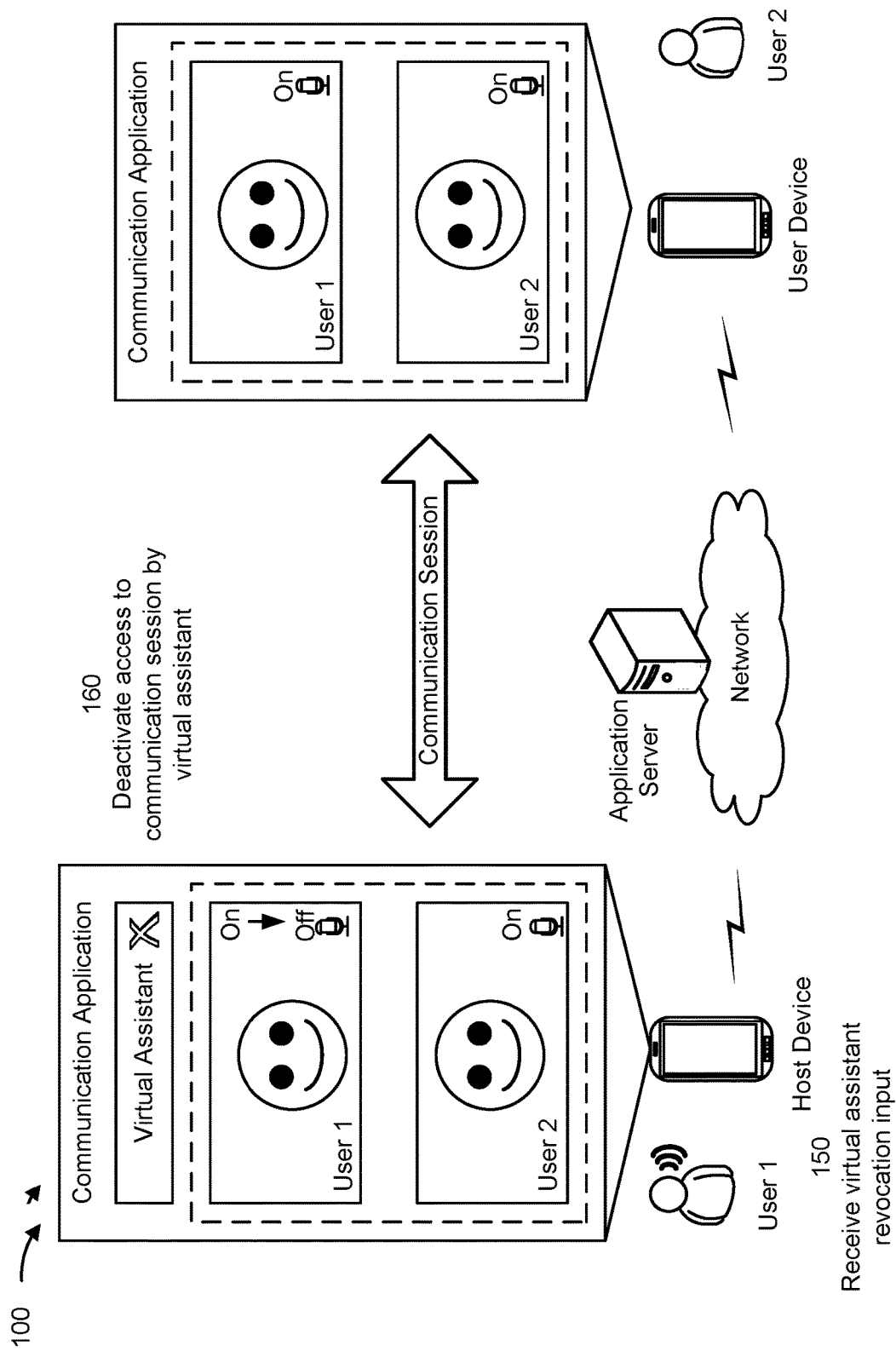

FIGS. 1A-1C are diagrams of an example implementation 100 associated with a virtual assistant for a communication session. As shown in FIGS. 1A-1C, example implementation 100 includes a host device, a user device, an application server, and a network. These devices are described in more detail below in connection with FIG. 5 and FIG. 6.

In example implementation 100, a first user (shown as User 1) of the host device may initiate and/or be engaged in a communication session with a second user (shown as User 2) of the user device. As shown, the communication session may include a video conference and/or virtual meeting that involves reception and transmission of audio-video signals by the users (User 1 and User 2) while at different locations, which enables communication between the users in real time. The communication session may be supported using a wide variety of devices. Accordingly, the host device and/or the user device may be a same or different type of device. For example, the host device or the user device may be a mobile phone, a desktop computer, a laptop computer, a tablet computer, and/or a smart television.

The communication session may correspond to a session of a communication application that is associated with the application server and/or that is installed on the host device and the user device. Accordingly, the communication session of example implementation 100 may be established via the application server and/or the network. The application server may be configured to perform any suitable processes to establish and/or maintain the communication session, such as authorizing the communication session, authenticating users involved in the communication session (e.g., User 1 and/or User 2), and/or routing communications of the communication session, among other examples. In some implementations, the communication session may be established via a peer-to-peer network or direct communication link (e.g., without the application server).

Although example implementation 100 is described in connection with a communication application executing on a device and/or a communication session of the communication application, one or more examples described in connection with FIGS. 1A-1C may similarly apply to other types of applications and/or corresponding types of sessions (e.g., a social media session of a social media application, an audio session or video session of a media application, and/or a web browsing session of a browser application, among other examples).

As shown in FIG. 1A, and by reference number 110, the host device receives a virtual assistant invocation input and activates the virtual assistant. For example, the host device may receive, from the first user, an invocation input that is configured to activate the virtual assistant. The host device may receive the invocation input via a user interface of the host device. For example, the user interface may include an input component of the host device, such as a physical button (e.g., a button that serves as a hot key to provide the invocation input), a key of a keyboard or keypad, and/or the like. Additionally, or alternatively, the user interface may include a graphical user interface button (or other type of clickable input element of a graphical user interface of the communication application) on the host device. In such a case, the graphical user interface button may be embedded within the graphical user interface of the communication application based on the virtual assistant being installed on the user device. More specifically, the virtual assistant may be installed as an extension and/or add-on of the communication application. In this way, the first user may provide the invocation input to the host device via a clickable user interface of the host device (e.g., a user interface that involves the user physically interacting with or touching an input component of the host device). Accordingly, the invocation input may be received without the first user disturbing or interrupting audio content of the communication session (e.g., using a voice-based invocation input).

In some implementations, the host device may receive the virtual assistant via a non-clickable user interface of the host device (e.g., a user interface that does not involve the user physically interacting with or touching an input component of the host device), such as a microphone or sensor of the host device. For example, the virtual assistant, in a standby mode, may be configured to monitor an audio input of the microphone to detect a spoken invocation input from the first user. In standby mode, the virtual assistant may be incapable of performing one or more operations associated with the user device and/or the communication session, and/or may be incapable of accessing information associated with the communication session. However, the virtual assistant may be removed from the standby mode and be activated (e.g., in an active mode) based on the virtual assistant processing an audio signal from the microphone that includes a voice-based invocation input (e.g., "activate virtual assistant" or any other suitable word or phrase that is spoken by the first user). In this way, the first user may provide the invocation input to the host device via a non-clickable user interface of the host device. Accordingly, the first user may provide the invocation input in a handsfree manner.

In some implementations, the virtual assistant may receive the voice-based invocation input while a voice input of the communication session is muted. For example, to prevent audio of the communication session from being interrupted by the voice-based invocation input, the first user may mute the first user's voice input to the communication session to prevent the voice-based invocation input from being transmitted via the communication session to the second user. Further, the user device and/or the communication application may be configured to enable and/or permit the virtual assistant to monitor an audio signal from the microphone and/or an audio input feed to the communication application (e.g., an audio input feed corresponding to the audio signal from the microphone and/or other audio data that is fed to the communication application from the user device). In this way, despite a voice input to the communication session being muted, the virtual assistant may still have access to an audio input of the user device and/or an audio input of the communication application (e.g., if the virtual assistant is installed as an extension of the communication application).

By activating the virtual assistant, the host device may enable the virtual assistant to access the communication session. For example, the host device may enable the virtual assistant to access an interface of the communication session, such as an input of the communication session (e.g., an audio input and/or a video input) and/or an output of the communication session (e.g., an audio output and/or a video output). Additionally, or alternatively, the host device may enable access to metadata associated with the communication session and/or the communication application. The metadata may include information associated with the communication session, such as information that identifies the users (e.g., via respective user identifiers), identifiers associated with the host device and the user device, connection information, status information, and/or any other suitable information that may be maintained by the communication application.

In some implementations, the first user may activate the virtual assistant to monitor the input and/or the output of the communication session. For example, the virtual assistant may be configured to monitor and/or process audio content and/or video content of the communication session. In such cases, the host device, based on activating the virtual assistant, may transmit a notification to the user device to indicate that the virtual assistant has been activated (e.g., to inform the second user that a virtual assistant has access to the audio content and/or the video content of the communication session). The notification may be provided via an audio output of the communication session (e.g., an audio output that is emitted via a speaker of the host device and/or a speaker of the user device) and/or configured to be displayed via a video output of the communication session (e.g., a video output that is presented within a graphical user interface of the host device or a graphical user interface of the user device). In some implementations, the video output and/or a graphical user interface (e.g., an area of the communication application that is displayed during the communication session and/or that is capable of being recorded during the communication session) may display the notification for the duration that the virtual assistant is active (e.g., during a time period that starts when the virtual assistant is invoked and that ends when the virtual assistant is revoked, as described herein). In this way, the host device and/or the virtual assistant may be configured to maintain privacy of a user engaged in the communication session and/or to suitably notify the user engaged in the communication session in order to abide by any or all applicable privacy laws associated with the communication session (e.g., by indicating, via the communication session and/or communication application, that the virtual assistant has access to information or content involving the communication session).

Accordingly, the host device, based on receiving the invocation input, may activate the virtual assistant to access the communication application and/or the communication session.

As further shown in FIG. 1A, and by reference number 120, the host device mutes a voice input of the first user to the communication session. For example, as mentioned above, the voice input may correspond to an audio input to the communication session associated with an audio signal from the microphone of the host device. The host device may be configured to automatically mute the voice input of the first user to the communication session based on receiving the invocation input. For example, the user device may mute the voice input prior to receiving a voice command associated with the virtual assistant, as described elsewhere herein. In this way, the host device may prevent audio of the communication session from being disturbed and/or interrupted by a voice command from the first user.

As further shown in FIG. 1A, and by reference number 130, the host device receives a virtual assistant voice command. For example, the first user may provide a voice command that is to be interpreted by the virtual assistant to cause the virtual assistant to assist the first user (e.g., by performing one or more operations identified in the voice command). As mentioned above, the voice input of the first user to the communication session may be muted to permit the voice command to be received by the virtual assistant without interrupting the audio of the communication session.

The voice command may be received via a microphone of the host device and/or based on the virtual assistant monitoring (e.g., based on receiving the invocation input) an audio signal received by the microphone of the host device. Accordingly, the voice command may be received based on the virtual assistant and/or the host device processing the audio signal using one or more suitable techniques. For example, using a speech to text (STT) technique, the virtual assistant and/or the host device may receive and/or obtain the voice command from the user by converting the audio signal to text (and/or voice command data that is representative of the voice command). Additionally, or alternatively, the virtual assistant and/or host device may process the voice command using a natural language processing technique. For example, the virtual assistant and/or the host device may be configured to parse a natural language description of an operation and/or one or more parameters of the operation. For example, the virtual assistant and/or the host device may obtain voice command data identifying, in natural language, a description of an operation that is to be performed by the virtual assistant, and may parse the voice command data to identify one or more parameters (e.g., settings, characteristics, subjects, users, and/or the like) that are to be addressed in the operation, and/or the like.

As further shown in FIG. 1A, and by reference number 140, the host device configures a communication session feature according to the voice command. In some implementations, the host device may enable (or cause) the virtual assistant to adjust a setting of the feature. Additionally, or alternatively, the host device may adjust the setting of the feature based on an instruction from the virtual assistant. In this way, the host device, in association with the virtual assistant, may identify and/or determine a setting of a feature of the communication session that is to be configured according to the voice command.

The setting and/or the feature may be identified in speech of the voice command using a natural language processing technique, as described elsewhere herein. The feature may include one or more of an audio feature (e.g., an audio output from one or more of the users involved in the communication session (such as a mute feature), a volume level adjustment feature of one or more users of the communication session, an audio filtering feature, and/or the like), a video feature (e.g., a video output from one or more of the users involved in the communication session, such as an on/off feature, a background adjust feature, a filtering feature, and/or the like), a chat feature (e.g., an instant messaging feature of the communication session), and/or a user preferences feature (e.g., to select and/or adjust preferences of the communication application, such as which input components and/or output components are to be used for the communication session), among other examples. In this way, the setting may include a volume level and the feature may include an audio output of the communication application. Additionally, or alternatively, the setting may include and/or a video setting and the feature may include a video output of the communication application, which is executing on the host device.

The setting and/or the feature may be associated with an operation involving the first user (e.g., an instruction to mute the first user's microphone, an instruction to turn off the first user's video feed to the communication session, among other examples). Additionally, or alternatively, the setting and/or the feature may be identified in the voice command in association with the second user (or another user of the communication session). For example, the setting and/or the feature may be associated with an operation involving the second user, such as an operation involving an adjustment to an audio output of the second user and/or an operation involving an adjustment to a video output of the second user. Correspondingly, the voice command may include an instruction to mute a voice input of the second user and/or to mute an audio output of the second user, an instruction to adjust a volume level associated with an audio output of the second user, an instruction to turn off a video feed of the second user, and/or the like.

In some implementations, the first user may be authorized to adjust a setting of a feature of the communication session for the second user and/or involving the second user, based on the first user being designated as the host of the communication session. Accordingly, based on receiving a voice command that is associated with the second user, the virtual assistant and/or the host device may determine and/or verify that the first user is designated as a host of the communication session. Based on the first user being designated as a host of the communication session, the virtual assistant and/or the host device may permit a setting of a feature associated with the second user to be configured and/or adjusted.

FIG. 1B provides examples of voice commands that may be received by the virtual assistant and/or the host device, and corresponding operations that may be performed by the virtual assistant and/or the host device in accordance with one or more example implementations described herein. As shown in FIG. 1B, and by reference number 130a (e.g., as an example of receiving a voice command), the first user may speak a voice command "Mute User 2." As mentioned elsewhere herein, the virtual assistant and/or the host device may utilize a natural language processing of the voice command (and/or voice command data) to interpret the voice command and/or identify a setting, a feature, and/or an operation that is to be performed according to the voice command. Accordingly, based on the voice command being interpreted as "Mute User 2", the virtual assistant and/or the host device may use natural language processing to determine that an audio feature of the second user is to be muted. In some implementations, the virtual assistant and/or the host device may identify which user of the communication session corresponds to the identified user based on metadata associated with the communication session (e.g., metadata that identifies "User 2"), or use other suitable techniques to identify the second user (e.g., a screen reading technique, such as an optical character recognition technique). Correspondingly, as shown by reference number 140a, the host device and/or the user device may cause the user's voice input to the communication session to be muted (as indicated by the second user's microphone being "Off").

As further shown in FIG. 1B, and by reference number 130b, the first user may speak a voice command "Turn off User 2 video output." Using natural language processing, the virtual assistant and/or the host device may interpret the voice command to determine that a video output of the communication application that is associated with the second user is to be turned off. Correspondingly, as shown by reference number 140b, the virtual assistant and/or the host device may deactivate and/or turn off a video feed of the second user on the host device. Accordingly, as indicated in the examples of FIG. 1B, based on the first user providing a voice command that identifies a setting and/or a feature in association with the second user, and/or the first user being the host of the communication session, the virtual assistant and/or the host device may determine that the setting and/or the feature are associated with the second user and configure the setting and/or feature of the second user according to the setting identified in the voice command.

As shown in FIG. 1C, and by reference number 150, the host device receives a virtual assistant revocation input. For example, the host device may receive, from the first user, a revocation input that is configured to deactivate the virtual assistant. Similar to the invocation input, the host device may receive the revocation input via any suitable user interface of the host device (e.g., a clickable user interface and/or a non-clickable user interface). The host device may receive the revocation input after performing one or more actions associated with one or more operations requested in the voice command. For example, the first user may want to deactivate the virtual assistant after the virtual assistant adjusts a setting of a feature of the communication session (e.g., so that the virtual assistant does not continue to monitor the communication session or monitor for other voice commands after adjusting the setting).

As further shown in FIG. 1C, and by reference number 160, the host device deactivates the virtual assistant. For example, the host device may disable, deactivate, and/or prevent the virtual assistant from accessing the communication session and/or one or more interfaces of the communication session.

In some implementations, based on the host device receiving the invocation input and/or the virtual assistant being activated, the virtual assistant is permitted to access the communication session until a corresponding revocation input is received to deactivate the virtual assistant. Therefore, the virtual assistant may iteratively receive, process, and perform one or more corresponding operations for multiple voice commands until the revocation input is received. Accordingly, the virtual assistant may be active during a duration of a time period that begins when the invocation input is received (or the virtual assistant is correspondingly activated) and ends when the revocation input is received (or the virtual assistant is correspondingly deactivated). In this way, the virtual assistant may be activated for the duration of a time period that is between (or based on) receiving the invocation input and receiving the revocation input.

Accordingly, as described herein, the host device is configured to enable a user to utilize a virtual assistant during or in association with a communication session, without disrupting the audio of the communication session. In this way, the host device, the virtual assistant, and/or the communication application may provide a relatively enhanced user experience (e.g., by providing handsfree control of the communication session and/or clear audio associated with the communication session) and/or prevent the host device from wasting resources during the communication session (e.g., computing resources and/or communication resources used to transmit voice commands of the virtual assistant via the communication session).

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
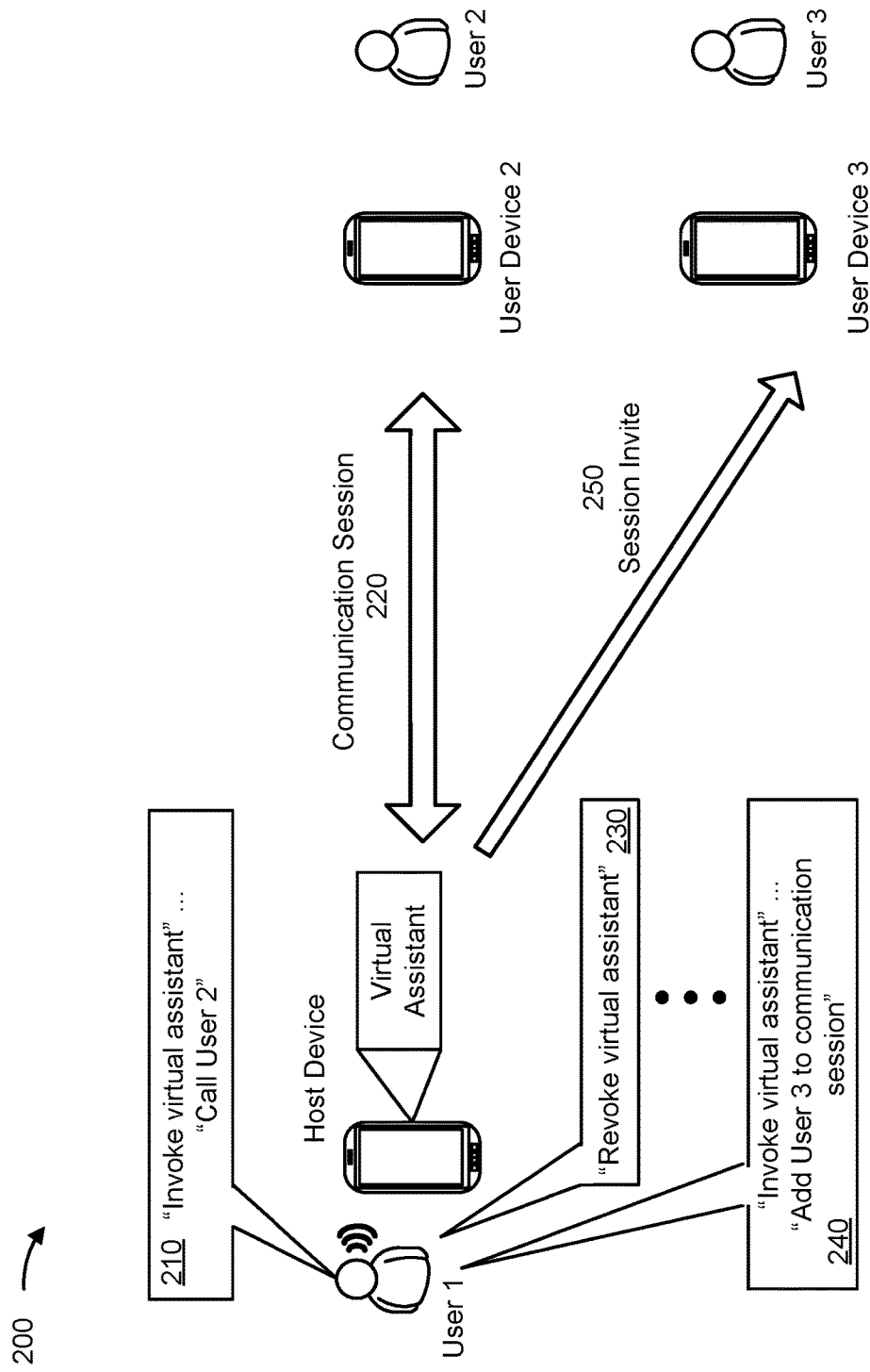
FIG. 2 is a diagram of an example implementation associated with a virtual assistant described herein.
Figure 3:
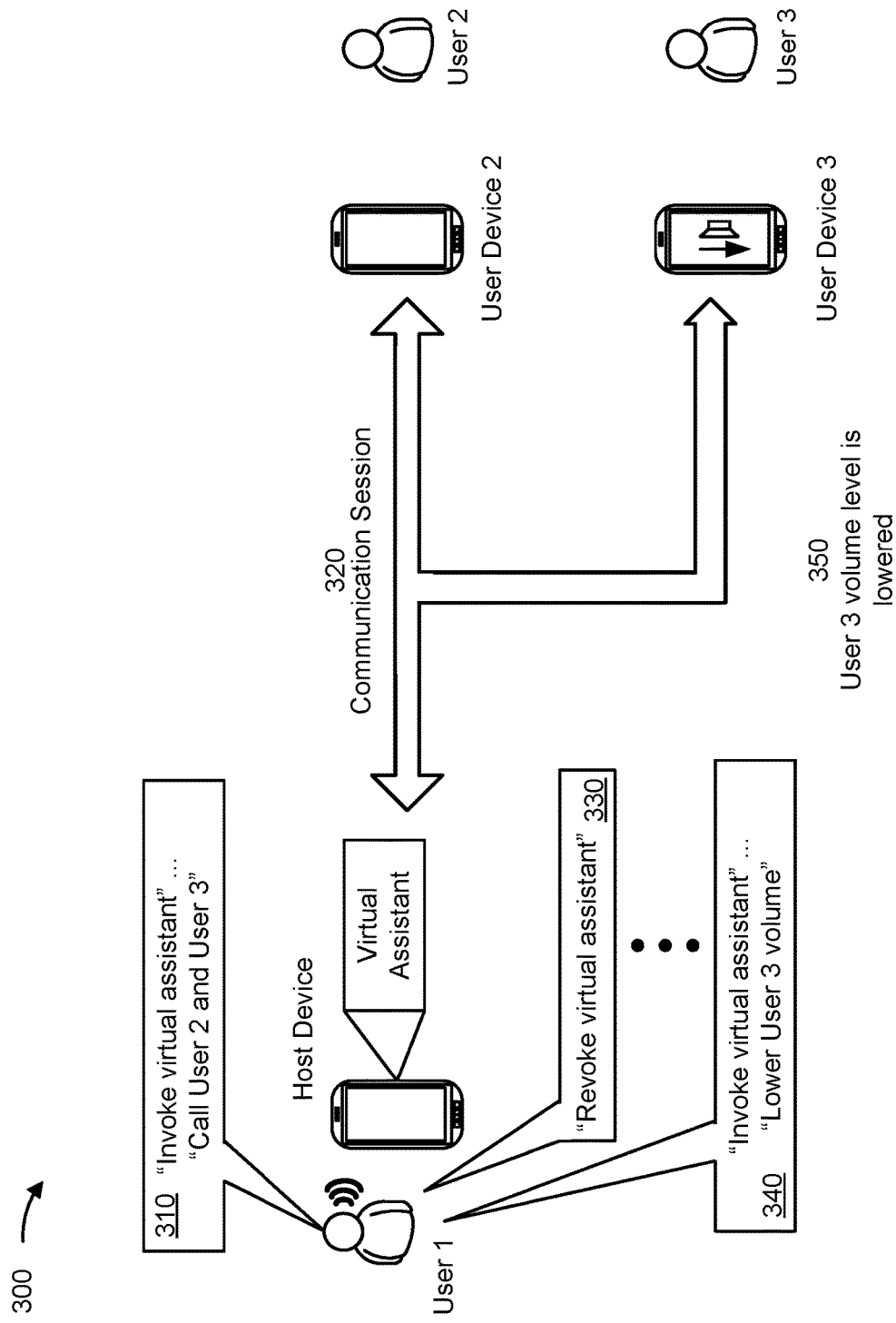
FIG. 3 is a diagram of another example implementation associated with a virtual assistant described herein.
Figure 4:
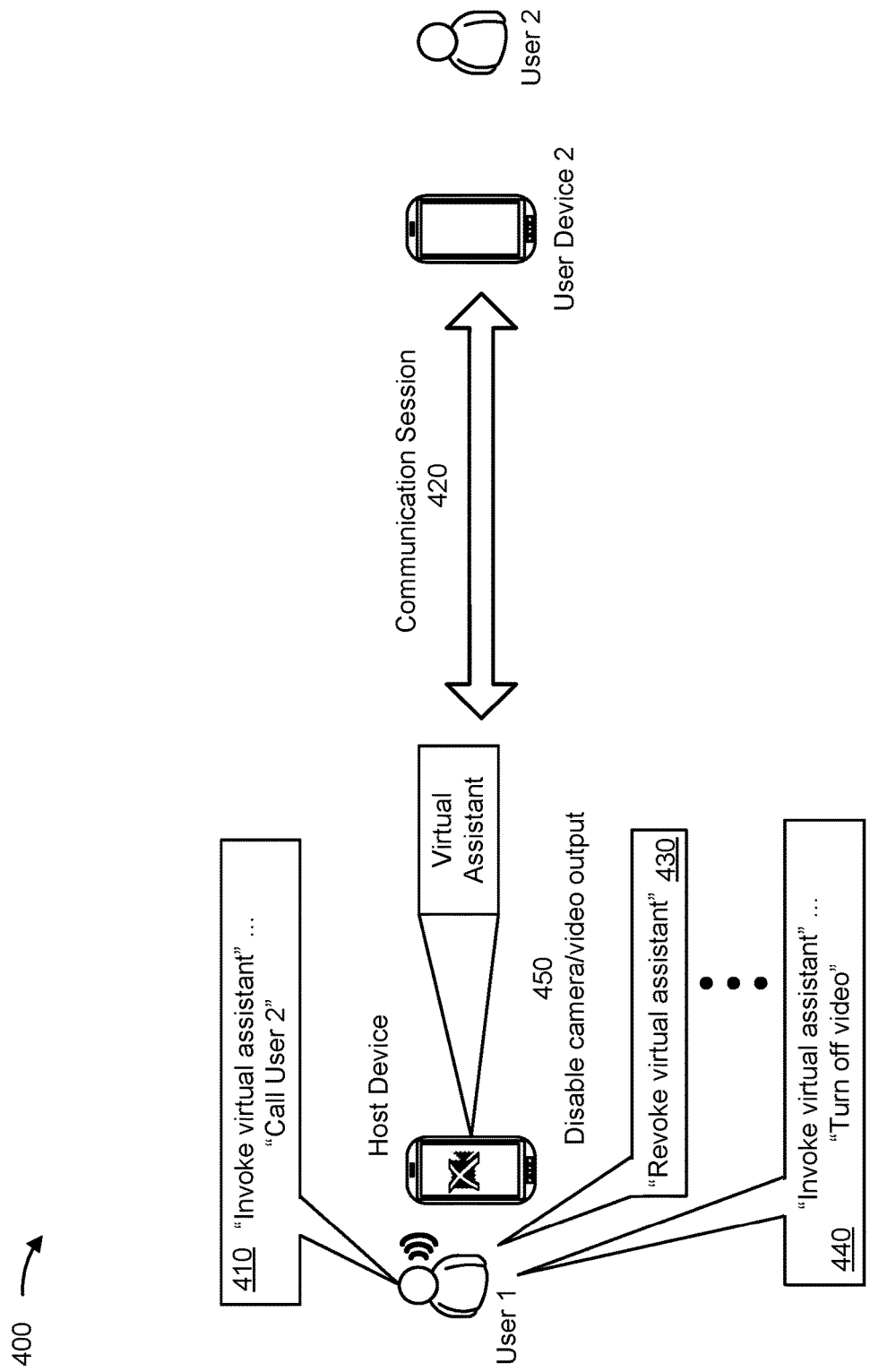
FIG. 4 is a diagram of another example implementation associated with a virtual assistant described herein.

FIGS. 2-4 are diagrams of example implementations associated with a virtual assistant for a communication session. As shown in FIGS. 2-4, the example implementations include a host device and a user device involved in a communication session.

As illustrated in FIG. 2, the communication session of example implementation 200 involves three users: User 1, User 2, and User 3. As shown by reference number 210, User 1 speaks an invocation input ("Invoke virtual assistant") and a voice command ("Call User 2") that instructs the virtual assistant to establish a communication session with User 2. Accordingly, as shown by reference number 220, based on the invocation input and the voice command, the host device and/or the virtual assistant establishes the communication session between the host device and a user device (User Device 2) of User 2. For example, the host device and/or virtual assistant may process the voice command by parsing the voice command to determine (e.g., based on a natural language processing of "Call") that the voice command is instructing the virtual assistant to establish the communication session and to identify contact information for User Device 2 (e.g., based on a natural language processing of "User 2" and/or a contact list of the host device that identifies the contact information for User 2 and/or User Device 2). Furthermore, as described elsewhere herein, the virtual assistant may remain active during the communication session (e.g., to receive additional voice commands from User 1) until a revocation input is received from User 1. In some implementations, the host device may provide a notification via the communication session that indicates that the virtual assistant is active.

As shown by reference number 230, User 1 speaks a revocation input ("Revoke virtual assistant"). Accordingly, the host device may deactivate the virtual assistant, as described elsewhere herein (e.g., to prevent the virtual assistant from having access to content and/or metadata associated with the communication session). In some implementations, if a notification was provided via the communication session, then the host device may turn off the notification and/or indicate that the virtual assistant is no longer active. As further shown in FIG. 2, and by reference number 240, User 1 may speak another invocation input ("Invoke virtual assistant") and another voice command ("Add User 3 to communication session"). Accordingly, as shown by reference number 250, based on the other invocation input and the other voice command, the host device and/or the virtual assistant sends a session invite to a user device (User Device 3) of User 3. For example, the host device and/or the virtual assistant may process the other voice command by parsing the other voice command to determine (e.g., based on a natural language processing of "Add" and/or context that the communication session is ongoing) that the voice command is instructing the virtual assistant to invite another user to the communication session and/or to identify contact information for that other user (e.g., based on a natural language processing of "User 3" and/or the contact list). In this way, the host device and/or the virtual assistant may enable a user to utilize a virtual assistant to establish a communication session and/or invite (or add) additional callers to an ongoing communication session.

As illustrated in FIG. 3, the communication session of example implementation 300 involves three users: User 1, User 2, and User 3. As shown by reference number 310, User 1 speaks an invocation input ("Invoke virtual assistant") and a voice command ("Call User 2 and User 3") that instructs the virtual assistant to establish a communication session with User 2 and User 3. Accordingly, as shown by reference number 320, based on the invocation input and the voice command, the host device and/or the virtual assistant establishes the communication session between the host device and a first user device (User Device 2) of User 2 and a second user device (User Device 3) of User 3. For example, the host device and/or virtual assistant may process the voice command by parsing the voice command to determine (e.g., based on a natural language processing of "Call") that the voice command is instructing the virtual assistant to establish the communication session and to identify contact information for User Device 2 and User Device 3 (e.g., based on a natural language processing of "User 2 and User 3" and/or a contact list of the host device). In this way, the host device and/or the virtual assistant may initiate a communication session with multiple users via a single voice command.

As shown by reference number 330, User 1 speaks a revocation input ("Revoke virtual assistant"). Accordingly, the host device may deactivate the virtual assistant, as described elsewhere herein. As further shown in FIG. 3, and by reference number 340, User 1 may speak another invocation input ("Invoke virtual assistant") and another voice command ("Mute User 3"). Accordingly, as shown by reference number 350, based on the other invocation input and the other voice command, the host device and/or the virtual assistant may lower the volume level associated with User 3 for the communication session. For example, the host device and/or the virtual assistant may process the other voice command by parsing the other voice command to determine (e.g., based on a natural language processing of "Lower [ . . . ] volume" and/or context that the communication session is ongoing) that the voice command is instructing the virtual assistant to lower an audio output of another user in the communication session and/or to identify the audio output of the other user (e.g., based on a natural language processing of "User 3" and/or identifying metadata associated with an audio output of User 3). In this way, the host device and/or the virtual assistant may enable a user to utilize a virtual assistant to adjust a setting of a feature associated with one of a plurality of users involved in a communication session.

As illustrated in FIG. 4, the communication session of example implementation 400 involves two users: User 1 and User 2. As shown by reference number 410, User 1 speaks an invocation input ("Invoke virtual assistant") and a voice command ("Call User 2") that instructs the virtual assistant to establish a communication session with User 2. Accordingly, as shown by reference number 420, based on the invocation input and the voice command, the host device and/or the virtual assistant establishes the communication session between the host device and a user device (User Device 2) of User 2. As shown by reference number 430, User 1 speaks a revocation input ("Revoke virtual assistant") that deactivates the virtual assistant, as described elsewhere herein.

As further shown in FIG. 4, and by reference number 440, User 1 may speak another invocation input ("Invoke virtual assistant") and another voice command ("Turn off video"). Accordingly, as shown by reference number 450, based on the other invocation input and the other voice command, the host device and/or the virtual assistant may deactivate a video feed of User 1. For example, the host device and/or the virtual assistant may process the other voice command by parsing the other voice command and using natural language processing to determine that the voice command is instructing the virtual assistant to turn off a camera of the host device and/or prevent transmission of a video feed of User 1 over the communication session. More specifically, based on a natural language processing of "Turn off video" and context of the host device indicating that the communication session is ongoing, the virtual assistant may determine that the instructor wants to deactivate User 1's video feed (rather than User 2's video feed) because the voice command did not specify another User in the command. In this way, the host device and/or the virtual assistant may enable a user to utilize a virtual assistant to establish a communication session and/or invite (or add) additional callers to an ongoing communication session.

As indicated above, FIGS. 2-4 are provided as examples. Other examples may differ from what is described with regard to FIGS. 2-4.

Figure 5:
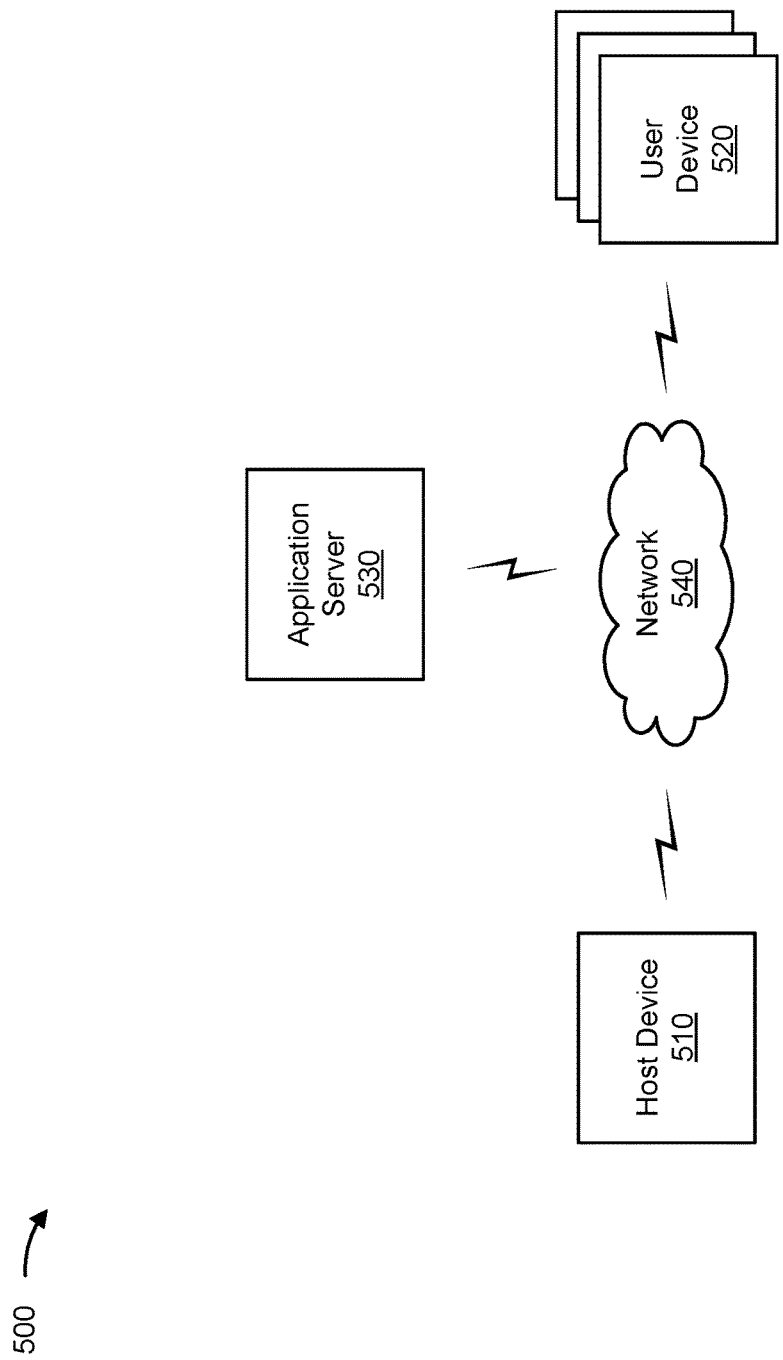
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a host device 510, one or more user devices 520, an application server 530, and a network 540. Devices of environment 500 may interconnect via wired connections, wireless connections, or a combination of wired and wireless connections.

The host device 510 includes one or more devices capable of receiving, generating, storing, processing, and/or providing information associated with hosting a virtual assistant and/or an application session associated with an application of the application server 530, as described elsewhere herein. The host device 510 may include a communication device and/or a computing device. For example, the host device 510 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The user device 520 includes one or more devices capable of receiving, generating, storing, processing, and/or providing information associated with an application session associated with an application of the application server 530, as described elsewhere herein. The user device 520 may include a communication device and/or a computing device. For example, the user device 520 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The application server 530 includes one or more devices capable of receiving, generating, storing, processing, providing, and/or routing information associated with a virtual assistant and/or an application session involving an application of the application server 530, as described elsewhere herein. The application server 530 may include a communication device and/or a computing device. For example, the application server 530 may include a server, such as a client server, a web server, a database server, a host server, a proxy server, a virtual server (e.g., executing on computing hardware), or a server in a cloud computing system. In some implementations, the application server 530 includes computing hardware used in a cloud computing environment.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
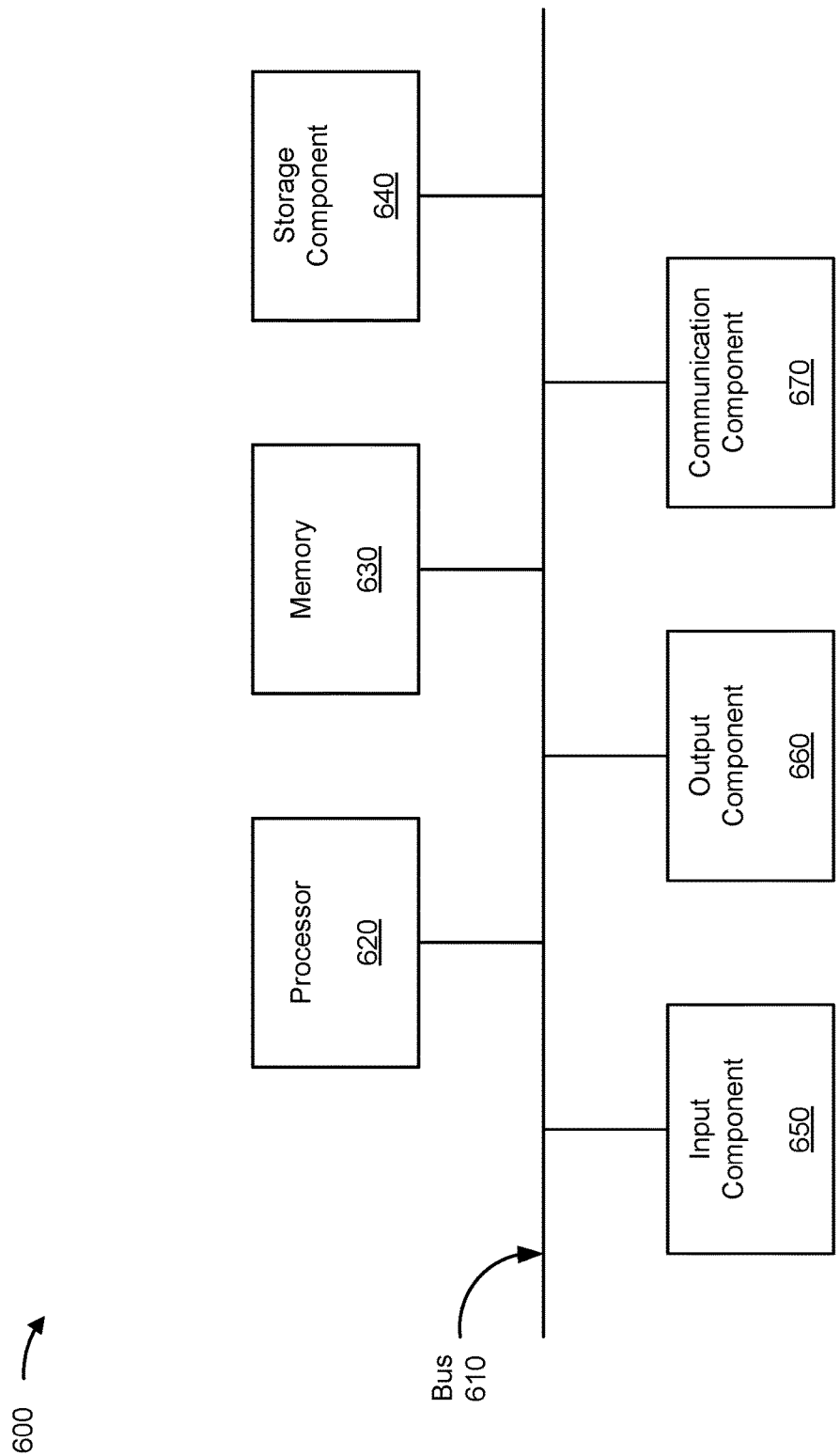
FIG. 6 is a diagram of example components of one or more devices of FIG. 5.

FIG. 6 is a diagram of example components of a device 600, which may correspond to the host device 510, the user device 520, and/or the application server 530. In some implementations, the host device 510, the user device 520, and/or the application server 530 may include one or more devices 600 and/or one or more components of device 600. As shown in FIG. 6, device 600 may include a bus 610, a processor 620, a memory 630, a storage component 640, an input component 650, an output component 660, and a communication component 670.

Bus 610 includes a component that enables wired and/or wireless communication among the components of device 600. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform a function. Memory 630 includes a random access memory, a read only memory, and/or another type of memory (e.g., a flash memory, a magnetic memory, and/or an optical memory).

Storage component 640 stores information and/or software related to the operation of device 600. For example, storage component 640 may include a hard disk drive, a magnetic disk drive, an optical disk drive, a solid state disk drive, a compact disc, a digital versatile disc, and/or another type of non-transitory computer-readable medium. Input component 650 enables device 600 to receive input, such as user input and/or sensed inputs. For example, input component 650 may include a touch screen, a keyboard, a keypad, a mouse, a button, a microphone, a switch, a sensor, a global positioning system component, an accelerometer, a gyroscope, and/or an actuator. Output component 660 enables device 600 to provide output, such as via a display, a speaker, and/or one or more light-emitting diodes. Communication component 670 enables device 600 to communicate with other devices, such as via a wired connection and/or a wireless connection. For example, communication component 670 may include a receiver, a transmitter, a transceiver, a modem, a network interface card, and/or an antenna.

Device 600 may perform one or more processes described herein. For example, a non-transitory computer-readable medium (e.g., memory 630 and/or storage component 640) may store a set of instructions (e.g., one or more instructions, code, software code, and/or program code) for execution by processor 620. Processor 620 may execute the set of instructions to perform one or more processes described herein. In some implementations, execution of the set of instructions, by one or more processors 620, causes the one or more processors 620 and/or the device 600 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
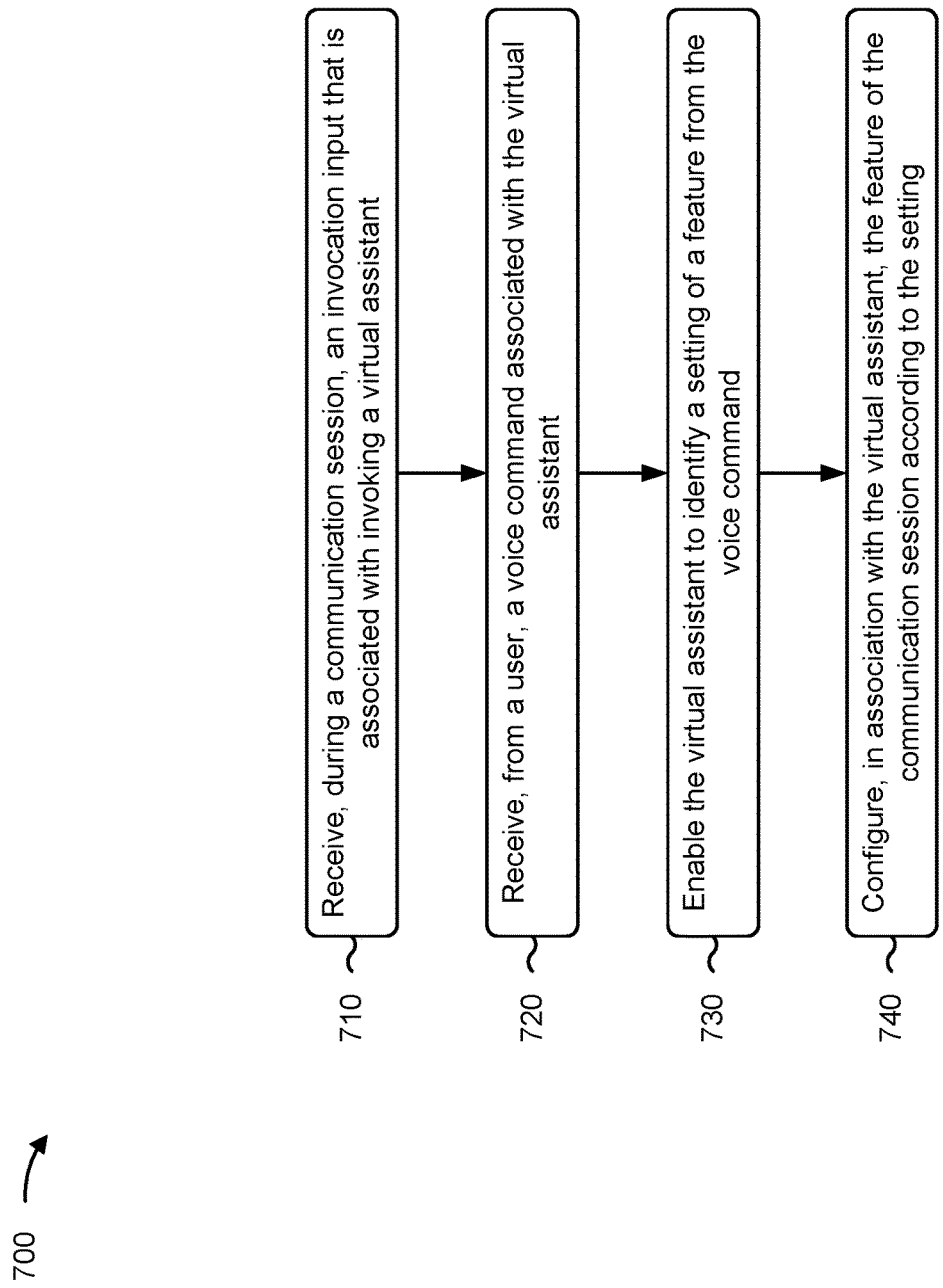
FIG. 7 is a flowchart of an example process associated with a virtual assistant for a communication session.

FIG. 7 is a flowchart of an example process 700 associated with a virtual assistant for a communication session. In some implementations, one or more process blocks of FIG. 7 may be performed by a host device (e.g., the host device 510). In some implementations, one or more process blocks of FIG. 7 may be performed by another device or a group of devices separate from or including the host device, such as a virtual assistant of the host device, a user device (e.g., the user device 520) and/or an application server (e.g., the application server 530). Additionally, or alternatively, one or more process blocks of FIG. 7 may be performed by one or more components of device 600, such as processor 620, memory 630, storage component 640, input component 650, output component 660, and/or communication interface 670.

As shown in FIG. 7, process 700 may include receiving, during a communication session, an invocation input that is associated with invoking a virtual assistant (block 710). For example, the host device may receive, during a communication session, an invocation input that is associated with invoking a virtual assistant, as described above.

In some implementations, the invocation input is received from a user, of the host device, that is involved in the communication session. The virtual assistant may be associated with a communication application that is hosting the communication session. In some implementations, the virtual assistant is associated with the communication application based on being installed on the device as an extension of the communication application.

The invocation input may be configured to cause the virtual assistant to automatically mute a voice input of the user to the communication session. In some implementations, the virtual assistant is configured to identify the setting of the feature based on at least one of a speech recognition technique, or a natural language processing technique.

As further shown in FIG. 7, process 700 may include receiving, from a user, a voice command associated with the virtual assistant (block 720). For example, the host device may receive, from the user, a voice command associated with the virtual assistant, as described above. In some implementations, the voice command includes instructions associated with adjusting a setting of a feature of the communication session.

As further shown in FIG. 7, process 700 may include enabling the virtual assistant to identify the setting of the feature from the voice command (block 730). For example, the host device may enable the virtual assistant to identify the setting of the feature from the voice command, as described above.

In some implementations, the setting includes a volume level and the feature includes an audio output of the communication application. Additionally, or alternatively, the setting may include a video setting and the feature may include a video output of the communication application.

In some implementations, the host device may output, based on the virtual assistant being activated, a notification that the virtual assistant has been activated. The notification may be output via an audio output or a video output of the communication session. In some implementations, the host device may enable the virtual assistant to access the communication session until a revocation input is received from the user.

As further shown in FIG. 7, process 700 may include configuring, in association with the virtual assistant, the feature of the communication session according to the setting (block 740). For example, the host device may configure, in association with the virtual assistant, the feature of the communication session according to the setting, as described above.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive, and should instead be understood as potentially combinable if such combinations are permissive in any way. In other words, any feature disclosed in any of the aforementioned examples or implementations may be included in any of the other aforementioned examples or implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method, comprising:
   receiving, by a device and during a communication session, an invocation input that is associated with invoking a virtual assistant,
      wherein the invocation input is received from a user involved in the communication session;
   activating, by the device, the virtual assistant to access a communication application that is hosting the communication session;
   receiving, by the device and from the user, a voice command associated with the virtual assistant;
   determining, by the device and via the virtual assistant, that a setting of a feature associated with another user of the communication session is to be adjusted according to the voice command,
      wherein the setting and the feature are identified in the voice command in association with the another user; and
   performing, by the device and in association with the virtual assistant, an action associated with configuring an output of the communication application that is associated with the another user according to the setting of the feature,
   wherein the user is authorized to adjust the setting of the feature based on being designated as a host of the communication session.

2. The method of claim 1, further comprising:
   prior to receiving the voice command, muting a voice input of the user to the communication session based on receiving the invocation input.

3. The method of claim 1, further comprising:
   receiving, after performing the action, a revocation input associated with the virtual assistant; and
   deactivating the virtual assistant to prevent access to the communication session,
   wherein the virtual assistant is permitted to access the communication session during a duration of a time period that is between receiving the invocation input and receiving the revocation input.

4. The method of claim 1, wherein at least one of:
   the setting comprises a volume level and the feature comprises an audio output of the communication application that is executing on the device,
      wherein the audio output associated with the another user; or
   the setting comprises a video setting and the feature comprises a video output of the communication application that is executing on the device,
      wherein the video output is associated with the another user.

5. The method of claim 1, further comprising:
   sending, based on the virtual assistant being activated, a notification that the virtual assistant has been activated,
   wherein the notification is sent via an audio output or a video output of the communication session to permit the another user to receive the notification.

6. The method of claim 1, wherein performing the action comprises at least one of:
   enabling the virtual assistant to adjust the setting of the feature, or
   adjusting, based on an instruction from the virtual assistant, the setting of the feature.

7. A device, comprising:
   one or more memories; and
   one or more processors, coupled to the one or more memories, configured to:
      receive, during a communication session, an invocation input that is associated with invoking a virtual assistant,
         wherein the invocation input is received from a user, of the device, involved in the communication session;
      activate the virtual assistant to access a communication application that is hosting the communication session;
      receive, from the user, a voice command associated with the virtual assistant;
      determine, via the virtual assistant, a setting of a feature of the communication application in association with the communication session,
         wherein the setting and the feature are identified in the voice command; and
      perform, in association with the virtual assistant, an action associated with configuring the setting of the feature,
      wherein the user is authorized to adjust the setting of the feature based on being designated as a host of the communication session.

8. The device of claim 7, wherein the one or more processors are further configured to:
   prior to receiving the voice command and based on receiving the invocation input, mute a voice input of the user to the communication session.

9. The device of claim 7, wherein the one or more processors, to determine the setting of the feature, are configured to:
   process the voice command using a natural language processing technique,
   wherein the setting and the feature are identified in speech of the voice command by the natural language processing technique.

10. The device of claim 7, wherein at least one of:
    the setting comprises a volume level and the feature comprises an audio output of the communication application; or
    the setting comprises a video setting and the feature comprises a video output of the communication application.

11. The device of claim 7, wherein the setting and the feature are identified in association with an output of another user of the communication session.

12. The device of claim 7, wherein the one or more processors are further configured to:
    output, based on the virtual assistant being activated, a notification that the virtual assistant has been activated, wherein the notification is output via an audio output or a video output of the communication session.

13. The device of claim 7, wherein the one or more processors, to perform the action, are configured to:
enable the virtual assistant to adjust the setting of the feature, or
adjust, based on an instruction from the virtual assistant, the setting of the feature.

14. A tangible machine-readable medium storing a set of instructions, the set of instructions comprising:
one or more instructions that, when executed by one or more processors of a device, cause the device to:
receive, during a communication session, an invocation input that is associated with invoking a virtual assistant,
wherein the invocation input is received from a user, of the device, involved in the communication session, and
wherein the virtual assistant is associated with a communication application that is hosting the communication session based on being installed on the device as an extension of the communication application;
receive, from the user, a voice command associated with the virtual assistant,
wherein the voice command includes instructions associated with adjusting a setting of a feature of the communication session;
enable the virtual assistant to identify the setting of the feature from the voice command; and
configure, in association with the virtual assistant, the feature of the communication session according to the setting.

15. The tangible machine-readable medium of claim 14, wherein the invocation input is configured to cause the virtual assistant to automatically mute a voice input of the user to the communication session.

16. The tangible machine-readable medium of claim 14, wherein the virtual assistant is configured to identify the setting of the feature based on at least one of:
a speech recognition technique, or
a natural language processing technique.

17. The tangible machine-readable medium of claim 14, wherein at least one of:
the setting comprises a volume level and the feature comprises an audio output of the communication application; or
the setting comprises a video setting and the feature comprises a video output of the communication application.

18. The tangible machine-readable medium of claim 14, wherein the one or more instructions further cause the device to:
output, based on the virtual assistant being activated, a notification that the virtual assistant has been activated,
wherein the notification is output via an audio output or a video output of the communication session; and
enable the virtual assistant to access the communication session until a revocation input is received from the user.

* * * * *